United States Patent
Shah et al.

(10) Patent No.: US 6,959,398 B2
(45) Date of Patent: Oct. 25, 2005

(54) UNIVERSAL ASYNCHRONOUS BOUNDARY MODULE

(75) Inventors: Paras A. Shah, Houston, TX (US); Prashantha Kalluraya, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 532 days.

(21) Appl. No.: 10/038,942

(22) Filed: Dec. 31, 2001

(65) Prior Publication Data

US 2003/0126491 A1 Jul. 3, 2003

(51) Int. Cl.[7] ................................................. G06F 5/06
(52) U.S. Cl. ...................... 713/600; 713/400; 713/500; 713/501; 713/502; 375/219; 375/220; 370/402; 370/911; 370/916; 711/167
(58) Field of Search ................................. 713/400, 500, 713/501, 502, 600; 375/219, 220; 370/402, 911, 916; 711/167

(56) References Cited

U.S. PATENT DOCUMENTS

| | | | |
|---|---|---|---|
| 5,548,620 A | * | 8/1996 | Rogers ........................ 375/354 |
| 5,991,833 A | | 11/1999 | Wandler et al. |
| 6,000,022 A | * | 12/1999 | Manning ..................... 711/167 |
| 6,006,340 A | | 12/1999 | O'Connell |
| 6,076,177 A | | 6/2000 | Fontenot et al. |
| 6,241,400 B1 | | 6/2001 | Melo et al. |
| 6,366,991 B1 | * | 4/2002 | Manning ..................... 711/167 |
| 6,393,502 B1 | * | 5/2002 | Meyer et al. ................. 710/58 |
| 6,668,292 B2 | * | 12/2003 | Meyer et al. ................. 710/61 |

FOREIGN PATENT DOCUMENTS

KR   99010977 A   *   2/1999   ......... H04L/12/433

\* cited by examiner

Primary Examiner—Lynne H. Browne
Assistant Examiner—Nitin C. Patel

(57) ABSTRACT

An application specific integrated circuit (ASIC) employs various logic blocks. The blocks may include logic circuits that operate at different clock rates. Consequently, an interface logic block may be needed to efficiently transfer signals from one frequency clock domain to another. One such interface, known as a universal asynchronous boundary module (UABM) is situated between the two domains allowing communication between the logic circuits.

22 Claims, 7 Drawing Sheets

UNIVERSAL ASYNCHRONOUS BOUNDARY MODULE

CROSS-REFERENCE TO RELATED APPLICATIONS

None.

STATEMENTS REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention generally relates to application specific integrated circuits (ASIC) and to a method for communications, and more particularly, to a logic device for facilitating an interface between logic circuits operating at two differing clock domains.

2. Description of the Related Art

Typically, computer hardware includes various data buses for transmitting data from one device to another. For example, a personal computer (PC) may have a main bus, a local bus, a video bus, etc. A computer server typically includes multiple microprocessors and data buses. Should a first device (e.g., a processor) on one bus need to communicate to a second device (e.g., a graphic's adapter) on another bus, an interface, such as a bridge, is employed to transfer the data seamlessly from one bus to another, and vice versa, if needed.

At times, the various computer buses may operate at different clock rates. For example, one of the local buses, such as a PCI (and its derivatives, PCI-X) may operate at 66 MHz, 100 MHz or 133 MHz and a legacy local bus, such as an ISA bus may operate at 8 MHz. Another example includes buses within an ASIC chip, such as an Inter Module Bus (IMB), which may operate at a higher frequency than a PCI (or PCI-X) bus, such as 200 MHz.

A prior method for coupling logic circuits operating at different frequencies (e.g., a first logic circuit operating at 100 MHz coupled to a second logic circuit operating at 50 MHz) includes an interface that would create a stretched version of a signal from the first logic circuit that was long enough to be detected by the second logic circuit. That is, the first logic circuit would send signals that are 10 nanoseconds long. But since the second logic circuit operates at 50 MHz, the second logic circuit would generally not be able to detect the signals since the second logic circuit would typically be able to detect signals that are 20 nanoseconds or longer. Consequently, the prior method would stretch a signal in time by resending the signal (signals transmitted in consecutive clock cycles). Thus, this prior method requires knowledge of the clock frequency domains for each logic circuit so that the interface can be designed to provide the necessary signal between the logic circuit. In addition, this prior method typically utilized logic that is inflexible to changing circumstances. That is, prior interfaces were designed to operate between particular logic circuit operating at known particular frequencies. Consequently, these interfaces generally could not be used with logic circuits operating at other frequencies that they were not designed for.

In addition, the prior method is typically limited by a frequency ratio. As mentioned above, interfaces used in prior methods are generally designed to handle a particular frequency ratio, e.g., 3:1. Thus, the frequency domain on one side could not be greater than 3 times the frequency of the other side. Furthermore, the prior method typically requires more logic to implement, thus requiring more precious silicon real estate.

BRIEF SUMMARY OF THE INVENTION

The present invention has broad applicability to situations where data is being communicated between two different frequency domains. However, the present invention will be described in the context of communications within a computer PC or server.

An interface, such as a Universal Asynchronous Boundary Module (UABM) is employed between logic circuits that operate at different clock or frequency domains. The UABM samples an input data stream from a first logic circuit and the UABM transmits the same data at a clock rate equal to the clock domain of a second logic circuit. In one embodiment, the UABM detects signal level changes (logic state changes) in the input data stream from the first logic circuit at a first clock rate, and upon an assertion (e.g., a pulse) in the input data stream, the UABM inverts the logic state of an intermediate signal. The intermediate signal then propagates through the UABM at a second clock rate. When the level change is detected in the intermediate signal, an asserted signal is outputted to the second logic circuit at the second clock rate, thus providing the input data stream at the first clock rate to the second logic circuit at the second clock rate.

Another embodiment includes an assertion of a mask signal. Should either logic circuit be reset, a signal is applied to mask the output of the UABM to prevent erroneous data from being transmitted to the second logic circuit.

BRIEF DESCRIPTION OF THE SEVERAL VIEWS OF THE DRAWINGS

A better understanding of the present invention can be obtained with the following detailed description of the preferred embodiment is considered in conjunction with the following drawings, in which.

DETAILED DESCRIPTION OF THE INVENTION

Figure 1:
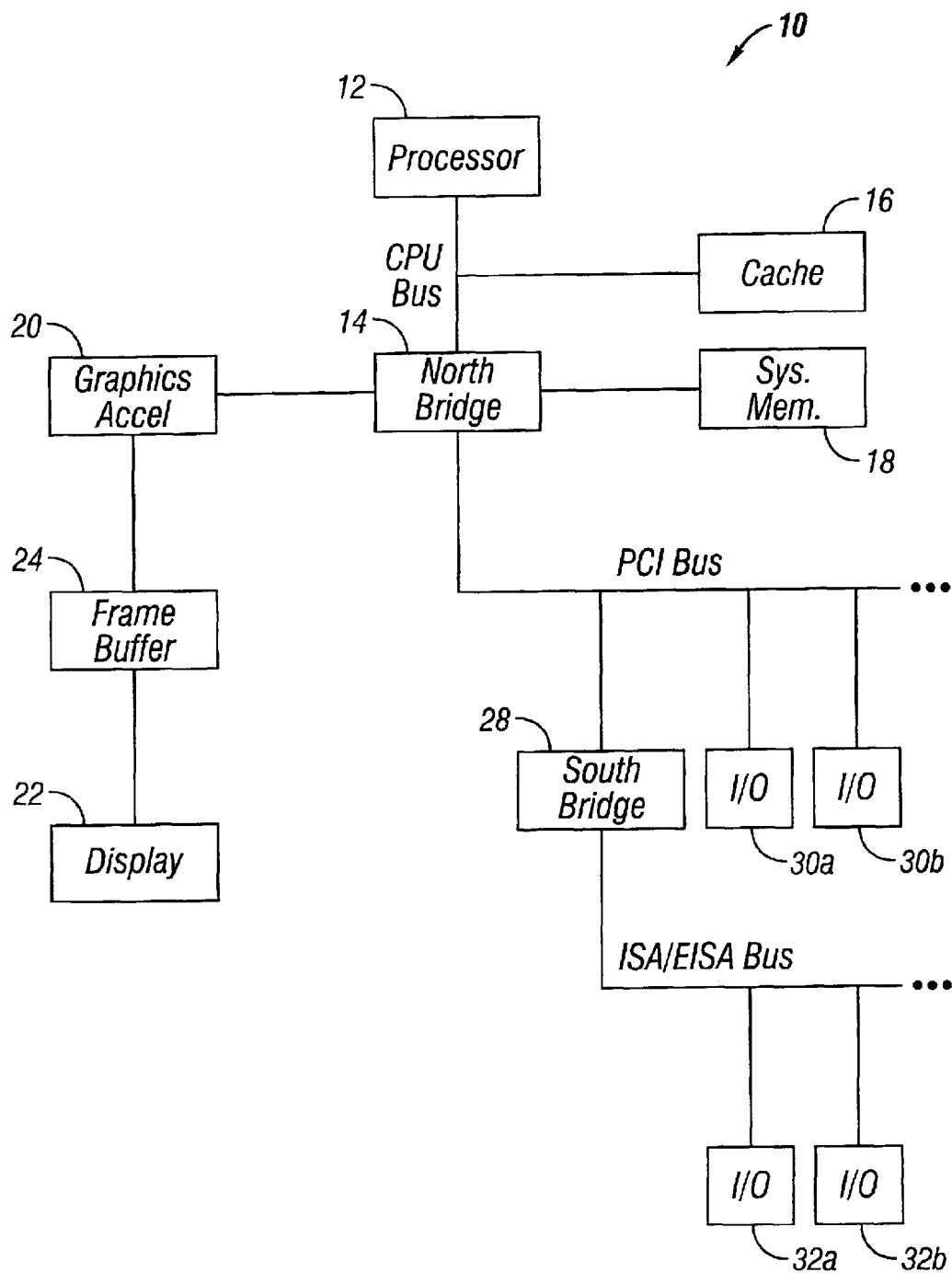
FIG. 1 is a computer system employing a single processor in which the techniques of this invention can be implemented.

Turning to the drawings, FIG. 1 illustrates a computer 10 having multiple buses, including a CPU bus, a mezzanine or PCI bus, and a peripheral bus or ISA/EISA bus. The CPU bus connects a CPU or processor 12 to a bus interface unit or north bridge 14. A cache memory 16 can be embodied within or external to CPU 12.

North bridge 14 provides an interface between components clocked at dissimilar rates. According to a typical system, the north bridge 14 interfaces a slower PCI bus and a faster CPU bus. The north bridge 14 may also contain a memory controller that allows communication to and from system memory 18. A suitable system memory 18 comprises DRAM or preferably SDRAM. The north bridge 14 may also include a graphics port to allow connection to a graphics accelerator 20. A graphics port, such as the Accelerated Graphics Port ("AGP") provides a high performance, component level interconnect targeted at three dimensional graphic display applications and is based on performance extensions or enhancements to PCI. AGP protocol is generally standard in the industry, the description of which is available from Intel Corporation.

The north bridge 14 is generally considered an application specific chip set, or application specific integrated circuit ("ASIC") that provides connectivity to various buses, and integrates other system functions such as a memory interface. System memory 18 is considered the main memory and refers to a portion of addressable memory that the majority of memory accesses target. The system memory 18 is accessed via the north bridge 14.

Unlike the CPU bus, which runs at speeds comparable to CPU 12, the PCI bus generally runs at speeds of 33 MHz. A south bridge 28 is coupled between the PCI bus and the peripheral bus. Similar to the north bridge 14, the south bridge 28 is an ASIC or group of ASICs that provide connectivity between various buses, and may also include system functions that can possibly integrate one or more serial ports. Attributable to the PCI bus are input/output ("I/O") devices 30 which require higher speed operation than I/O devices 32.

Figure 2A:
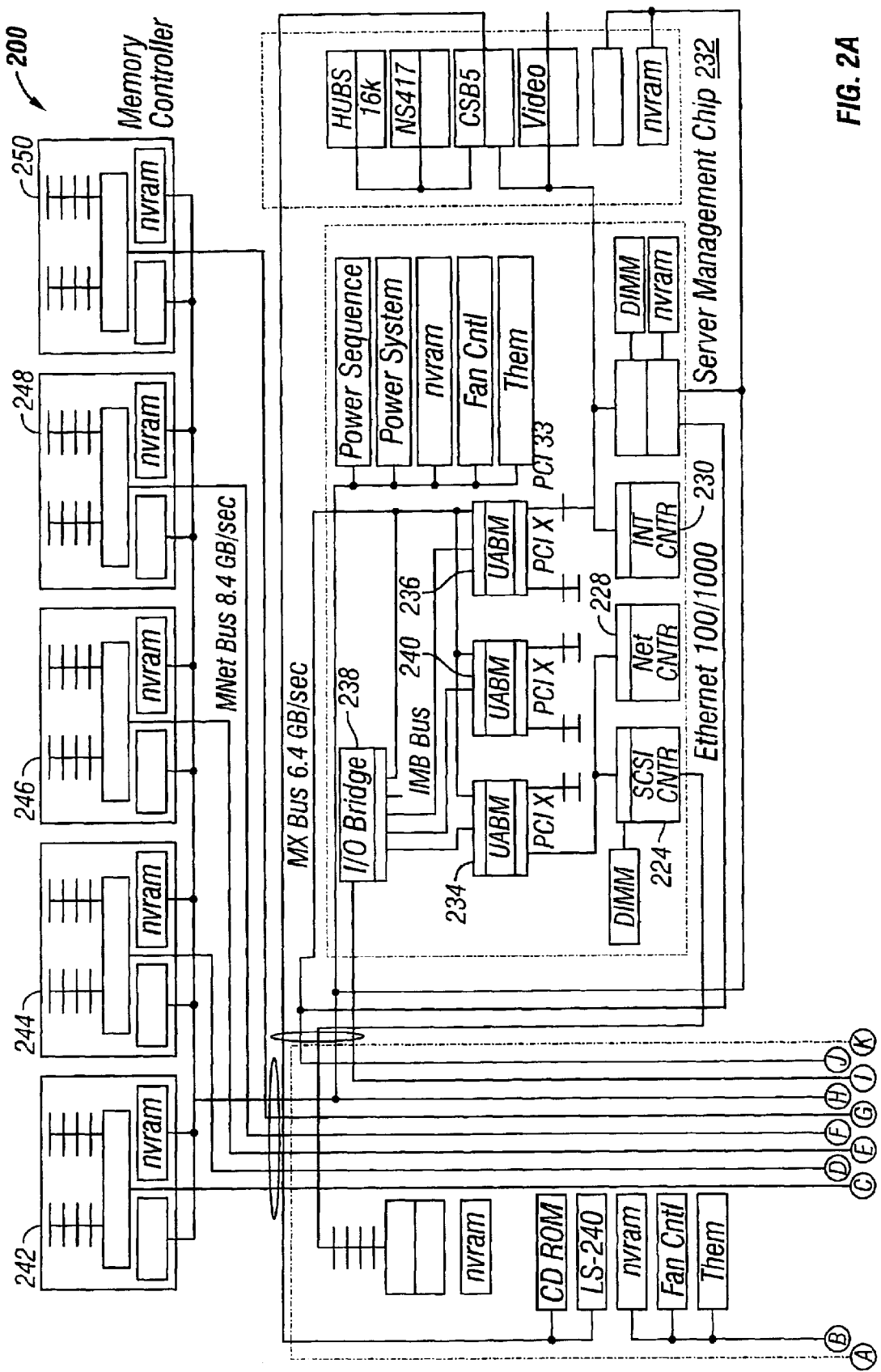
FIG. 2 is a computer system utilizing multiple processors in which the techniques of this invention can be implemented.
Figure 2B:
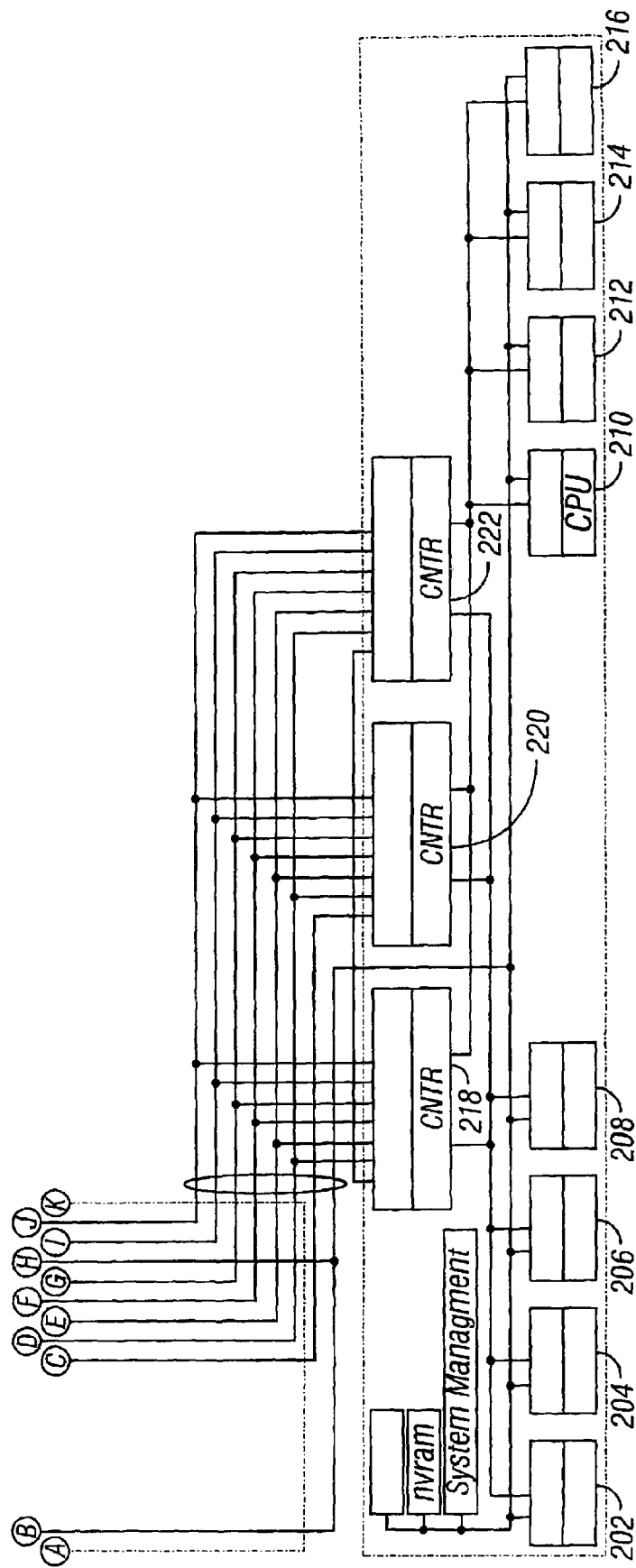

FIG. 2 illustrates a computer system 200 having multiple processors 202–216. The processors 202–216 are coupled to processor bus address/data controllers 218, 220 and 222. The processors 202–216 are not limited to a particular type, but in one embodiment, the processors are Intel IA-64 microprocessors (Intel Corp. of Santa Clara, Calif.).

The computer system 200 can also include various PCI-X expansion cards such as a SCSI controller 224, a network controller 228, an interrupt controller 230 and a server management chip 232. The computer system 200 can also include memory controllers 242–250 for the processors 204–216 to access memory, such as RAM. The PCI-X expansion cards are coupled to bridges, which may include universal asynchronous boundary modules (UABM) 234 and 236. Communications between the processors 202–216 are done via a data bus. To ensure high data rates, the data bus is coupled to an I/O bridge 238.

Next, the I/O bridge 238 is coupled to a high-speed Inter-Module Bus (IMB) 240. In certain computer system configurations, the IMB and the PCI-X bus operate at different clock rates. For example, the IMB 240 in one embodiment can operate at 200 MHz and a PCI-X bus can operate at 33 MHz. Thus, the UABMs 234 and 236 within the bridges couple the IMB and PCI-X buses and provide the interface between the two different data buses, so that data from one logic circuit can communicate with another logic circuit operating at a different clock rate.

The above description is illustrative only. As mentioned previously, the invention can be implemented in other applications, unrelated to computer systems. For example, the invention can be implemented in a cellular telephone, such as a telecommunication ASIC chip operating at a first clock rate coupled to a microcontroller operating at a second clock rate.

Figure 3:
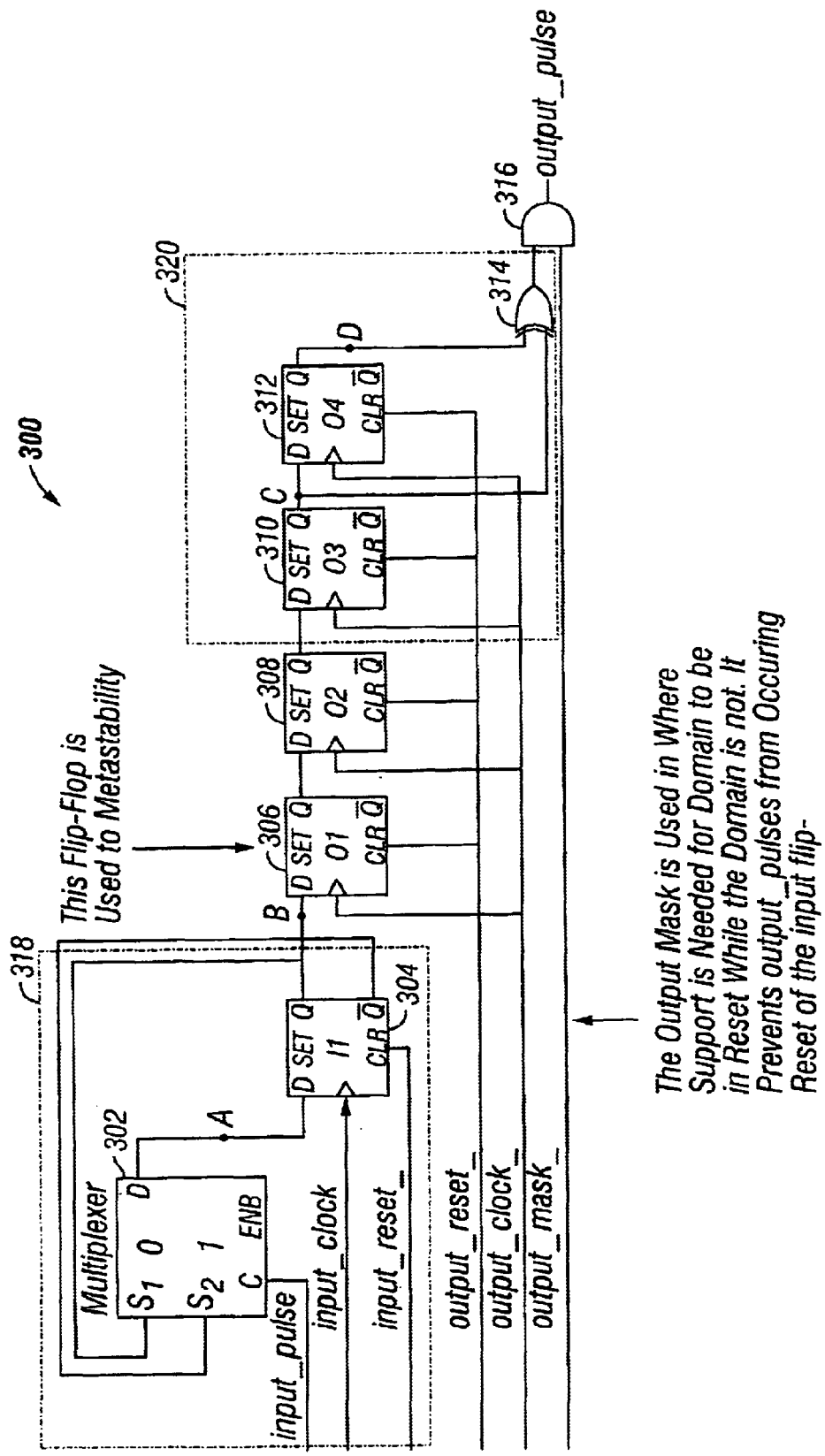
FIG. 3 is a logic diagram of a universal asynchronous boundary module.

FIG. 3 illustrates a logic diagram of one embodiment of a UABM implemented employing the techniques according to the invention. As mentioned previously, the UABM can be implemented (e.g., within a bridge) to couple data buses, such as PCI to ISA, or PCI to IMB. The input to the UABM 300 is to an input logic block 318, wherein the input to the input logic block 318 is identified by the signal line INPUT_PULSE to a multiplexer 302. The input logic block 318 includes the multiplexer 302 and a memory device or register, such as a D-type flip-flop 304. The INPUT_PULSE signal may originate from another input logic circuit (not shown) that is coupled to a data bus, such as an IMB bus. Depending on whether the INPUT_PULSE has a logic 0 or 1 value, the multiplexer 302 provides a logic 0 or 1 to the register 304.

The register 304 is clocked by an INPUT_CLOCK signal. The INPUT_CLOCK signal can also be used to clock the devices in the input logic circuit (not shown). The register 304 can also be reset by an INPUT_RESET_signal (for signal convention a SIGNAL_refers to an active low, i.e., logic 0, for an asserted signal). Inputs to the multiplexer 302 are provided by the Q and $\overline{Q}$ outputs of the register 304. The multiplexer 302 outputs the $\overline{Q}$ (an inverted Q signal) signal to the D input of the register 304 when the INPUT_PULSE signal to the multiplexor 302 is asserted (i.e., a pulse is received). Thus, if the INPUT_PULSE signal is deasserted, the multiplexor 302 provides the same signal (from the Q output of the register 304) to the D input of the register 304, and the Q output remains unchanged at the next INPUT_CLOCK clock cycle.

If the INPUT_PULSE signal is a pulse (an assertion), then the multiplexer 302 output switches to its $S_2$ input, which is coupled to the $\overline{Q}$ output of the register 304. This inverts the Q output of the register 304 in the next clock cycle. As noted before, the register 304 is clocked by the INPUT_CLOCK signal. Conversely, if the INPUT_PULSE signal is not a pulse (i.e., a deasserted signal), then the multiplexor 302 switches to its $S_1$ input, which is coupled to the Q output of the register 304 and provides the signal Q to the D input of the register 304. Therefore, the register 304 would continue to clock the same data until the multiplexer 302 would receive an asserted INPUT_PULSE signal. A detailed view of the signal states of the UABM 300 will be provided in later figures.

Registers 306–308 are coupled to the register 304, and are preferably provided to address metastability issues. The registers 306–308 are clocked by the clock of a second logic circuit (not shown), identified as an OUTPUT_CLOCK signal. As mentioned previously, the second logic circuit may be composed of PCI devices operating at a different clock rate than the first logic circuit.

To address the issue of metastability, should the clock rates for the INPUT_CLOCK and OUTPUT_CLOCK be different, the additional registers 306–308 are added in the UABM 300. The registers 306–308 (or metastability registers) can be any type of memory device, such as D-type flip-flops. The number of registers used to address metastability issues is not necessarily limited by the number of registers shown in the figure. One solution for addressing metastability issues is to register the signal a second, and possibly a third time, using the plurality of D-type flip-flops.

In one embodiment, two (2) metastability registers 306 and 308 are utilized when one of the logic circuits operates at 200 MHz.

Thus, at each OUTPUT_CLOCK clock cycle, data (or for the purposes of clarity, an intermediate signal) propagates through the registers 306–308 at the clock rate of the OUTPUT_CLOCK signal rate. The Q output of the metastability register 308 is provided to the D-input of a register 310. The registers 310 and 312 are also clocked by the OUTPUT_CLOCK signal. The signal from the Q output of register 310 is provided to the D input of a register 312. The registers 310 and 312 can be any type of memory device, such as a D-type flip-flop. The registers 310 and 312 along with an XOR gate 314 comprise an output logic block 320 of the UAMB 300. When the OUTPUT_CLOCK signal provides a clock pulse to the register 312 clock input, the intermediate signal is clocked out of the register 312 to the XOR gate 314. Thus, when the D input of the register 312 is different from its Q output, the XOR gate 314 provides a logic 1 to an AND gate 316. Thus, as an assertion in the INPUT_PULSE signal is received by the input logic block 318, the output logic block 320 provides the same signal, however, at the clock rate provided by the OUTPUT_CLOCK signal. This is because the OUTPUT_CLOCK signal propagates the intermediate signal through the final register 312 in one clock cycle, so the inputs to the XOR gate 314 are thus different for that single clock cycle.

To ensure signal integrity as a result of one logic circuit resetting while the other logic circuit does not, the output signal of the output logic block (XOR gate 314) is ANDed with an OUTPUT_MASK_ signal. For example, it may be necessary to reset one logic circuit as a result of a change in clock frequencies, as denoted by the INPUT_CLOCK signal. One such scenario is when a PCI card is operating at 66 MHz. The computer system may allow hotplugging of PCI cards. Thus, if one PCI card is removed and replaced with another PCI card that operates at a different frequency, such as a 100 MHz, the computer system will reset this logic circuit. However, it is possible that the rest of the computer system will not be reset. Thus, during this transition, should one of the logic circuits reset and not the other, a deasserted OUTPUT_MASK_ signal is provided to the AND gate 316 so that the OUTPUT_PULSE signal is not erroneous due to the reset of one of the logic circuits.

Figure 4:
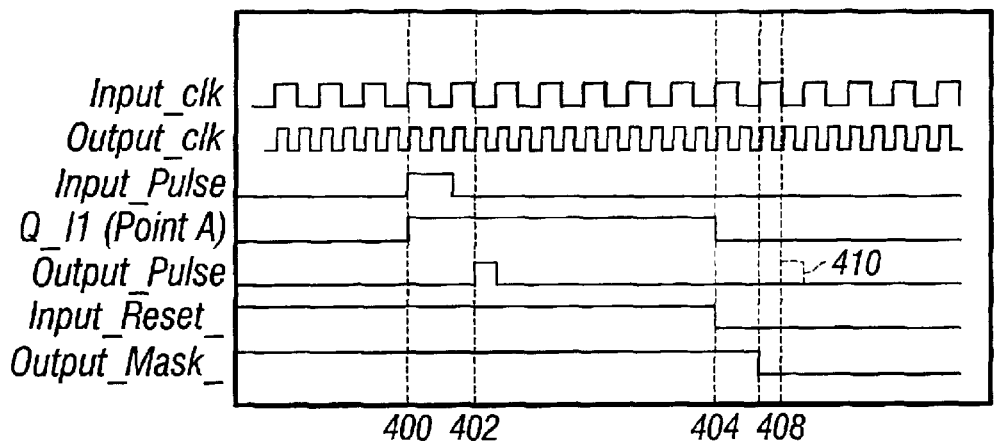
FIG. 4 is a timing diagram wherein the input logic circuit is reset.

FIG. 4 is a timing diagram wherein an input logic circuit is reset. At timing reference 400, the INPUT_PULSE signal is asserted (e.g., a pulse). The multiplexer 302 provides the $\overline{Q}$ output of the register 304 to the D input of the register 304. Therefore, the logic state of the Q output of the register 304 inverts (for illustrative purposes, the Q output of the register 304 transitions from logic 0 to logic 1 at time reference 400, as denoted by the Q I1 signal) after one clock cycle of the INPUT_CLOCK. After propagating through the metastability registers 306 and 308, the OUTPUT_PULSE signal is asserted at timing reference 402 (since the inverted signal is detected). Should the input logic circuit be reset, the register 304 would also be reset (the Q output of register 304 transitions to logic 0 and the $\overline{Q}$ output of the register transitions to logic 1).

For example, at timing reference 404, an INPUT_RESET_ signal is asserted (in this case, an assertion is an active low, or logic 0). Thus, the Q output of the register 304 is reset to logic 0. However, since the metastability registers 306–308 and output registers 310 and 312 are unaffected by the INPUT_RESET_signal, the Q output of register 304 will propagate through the registers 306–312 at a clock rate equal to the second clock (OUTPUT_CLOCK). Consequently, once the logic 0 signal of the Q output of the register 304 propagates to the Q output of the register 310, an OUTPUT_PULSE asserted signal would be provided. Therefore, to mask this erroneous pulse, an OUTPUT_MASK_signal is asserted, sometime after the INPUT_RESET_signal is asserted, at timing reference 406. Referring back to FIG. 3, the output of the XOR gate 314 and the OUTPUT_MASK_ signal are ANDed at AND gate 316. Since the OUTPUT_MASK_signal is asserted (logic 0) the OUTPUT_PULSE signal does not include the erroneous pulse 410.

Figure 5:
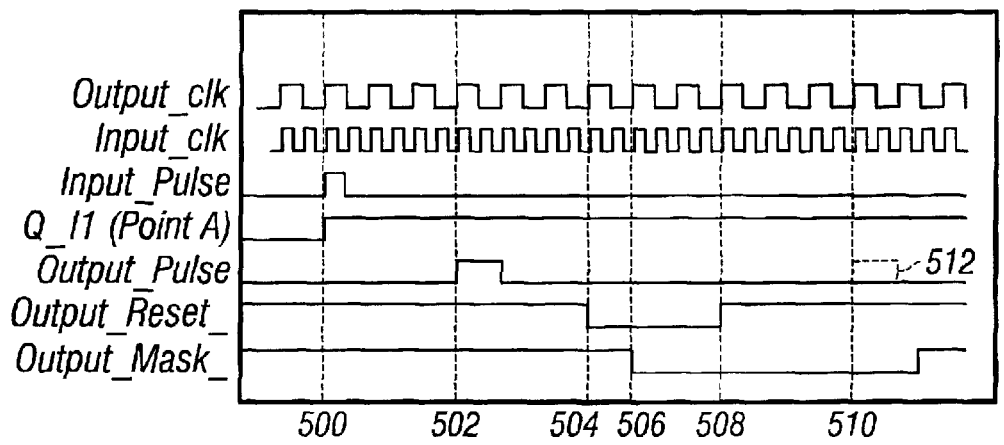
FIG. 5 is a timing diagram wherein the output logic circuit is reset.

FIG. 5 is a timing diagram wherein an output logic circuit is reset. At timing reference 500, the INPUT_PULSE signal is asserted (e.g., a pulse). The multiplexer 302 provides the $\overline{Q}$ output of the register 304 to the D input of the register 304. Consequently, the register 304 provides an inverted signal at the next INPUT_CLOCK clock cycle. After the signal propagates through the metastability registers (e.g., 306 and 308), the output logic block 320 provides a pulse (in the OUTPUT_CLOCK domain) at timing reference 502. Should the output logic circuit be reset, an OUTPUT_RESET_signal is asserted at timing reference 504. Once the OUTPUT_RESET_ signal is asserted, the metastability registers 306 and 308 and output logic block 320 registers 310 and 312 are also reset (i.e., the Q outputs of these registers transition to logic 0). Consequently, when the registers 306–312 come out of reset (see timing reference 508), it is possible that the output logic block 320 would produce an erroneous pulse 512 at timing reference 510. Therefore, to prevent the erroneous pulse 512 from being generated, the output of the logic block 320 is ANDed with an OUTPUT_MASK_signal at AND gate 316 to mask the OUTPUT_PULSE signal.

Figure 6:
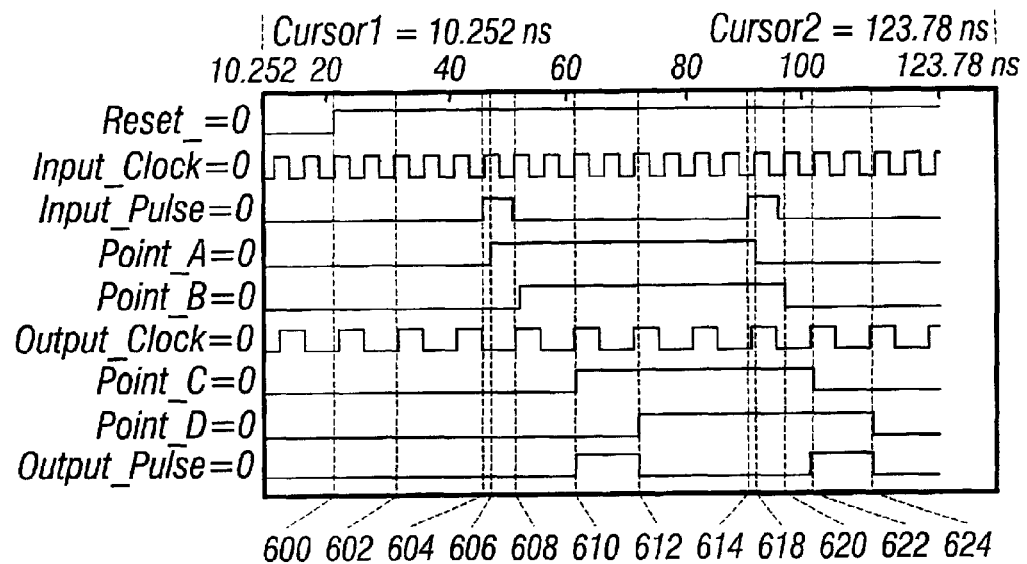
FIG. 6 is a timing diagram wherein the input logic circuit operates at a higher clock rate than the output logic circuit.

FIG. 6 is a timing diagram wherein the input logic circuit operates at a higher clock rate than the output logic circuit. As noted in the timing diagram, the INPUT_CLOCK signal has a higher data rate than the OUTPUT_CLOCK signal. Furthermore, POINT_A, POINT_B, POINT_C and POINT_D signals refer to the logic state of the signals at the locations designated by A, B, C, and D, as shown in FIG. 3. The signal denoted by RESET_denotes the INPUT_RESET_and OUTPUT_RESET_ signals of FIG. 3. (RESET_represents that a signal is active low, i.e., asserted with a logic 0).

At a time reference 600, the RESET_signal is deasserted. The INPUT_PULSE is at logic 0 during this time. At the next clock cycle of the INPUT_CLOCK signal, the logic 0 propagates through the register 304, as denoted by the logic 0 at POINT_B. For clarity purposes, the logic state of POINT_B refers to the initial logic state of an intermediate signal. The intermediate signal traverses through the registers at each output logic circuit clock cycle as denoted by POINT_C and POINT_D. Since the logic states of POINT_C and POINT_D are logic 0, the OUTPUT_PULSE signal is also a logic 0 at each instance of the OUTPUT_CLOCK cycle.

Thereafter, at time reference 604 the INPUT_PULSE signal changes to a logic 1, causing the multiplexer 302 to also provide a logic 1 to the D input of the register 304 as denoted by POINT_A. At the next clock cycle of the INPUT_CLOCK, the register 304 provides the logic 1 at its Q output as denoted by POINT_B. The intermediate signal traverses metastability registers (note, the timing figure takes into account two (2) metastability registers) at the OUTPUT_CLOCK rate. Thus, at two clock cycles of the OUTPUT_CLOCK signal, a logic 1 is provided to the D input of the register 312. Since, the register 312 is being clocked by the OUTPUT_CLOCK signal, the Q output of the register changes to a logic 1. Since POINT_C and POINT_D are logically different (as shown at time reference 610), the output of the XOR gate 314 transitions to a logic 1 as denoted at time reference 610. Once POINT_D transitions to a logic 1, the output of the XOR gate 314 transitions to a logic 0 (as shown at 612). The OUTPUT_PULSE remains at a logic 0 until the INPUT_PULSE transitions from a logic 0 to a logic 1 (as shown at 614). The time references 614, 616, 618, 620, and 622 show a second INPUT_PULSE that causes an OUTPUT_PULSE assertion. The behavior is identical to the above description, except the initial logic state of the intermediate signal (POINT_B) is now 1 instead of 0.

Figure 7:
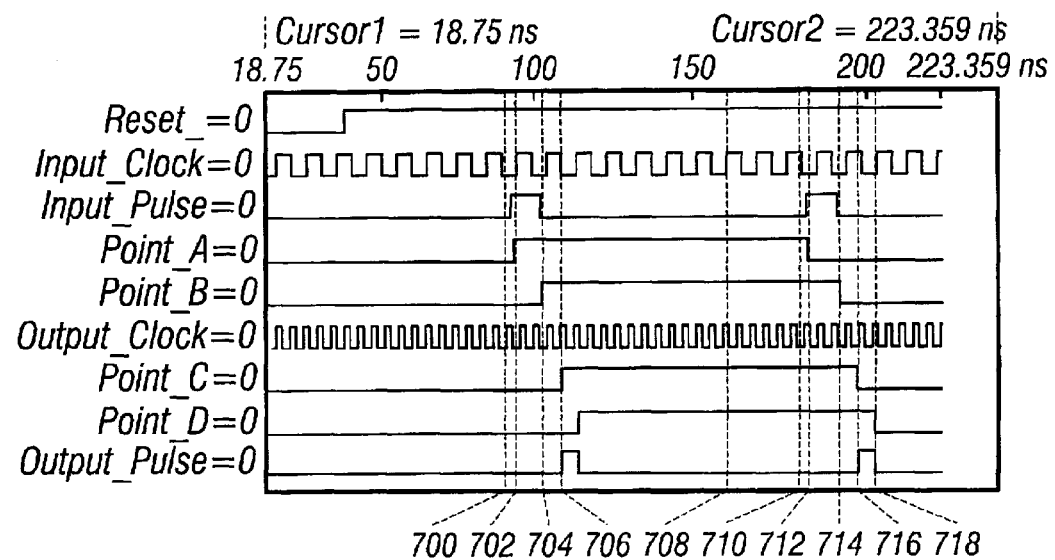
FIG. 7 is a timing diagram wherein the input logic circuit operates at a lower clock rate than the output logic circuit.

FIG. 7 illustrates a timing diagram where the input logic block operates at a lower clock rate than the output logic block. As shown in the figure, the INPUT_PULSE signal transitions to a logic 1 for one clock cycle commencing at 700. Sometime thereafter (timing reference 702), POINT_A transitions to a logic 1 as a result of the multiplexer 302. Once again, for clarity purposes, the logic state of POINT_B refers to the initial logic state of an intermediate signal. The output of the register 304 transitions to a logic 1 after one clock cycle of the INPUT_CLOCK (as shown in 704). The intermediate signal is clocked through the metastability registers at the OUTPUT_CLOCK rate. Thus, at 706, POINT_C transitions to a logic 1. Since POINT_D was previously at a logic 0, the output of the XOR gate 314 transitions to a logic 1. Since the register 312 will clock the data at the OUTPUT_CLOCK rate, at 708, POINT_C and POINT_D are equal, thus the OUTPUT_PULSE signal remains at a logic signal 0 until the INPUT_PULSE signal transitions to a logic 1 (i.e., the INPUT_PULSE signal is a pulse, as shown at 710). The time references 710, 712, 714, 716, and 718 show a second INPUT_PULSE that causes an OUTPUT_PULSE assertion. The behavior is identical to the above description, except the initial state of the intermediate signal (POINT_B) is now 1 instead of 0.

Figure 8:
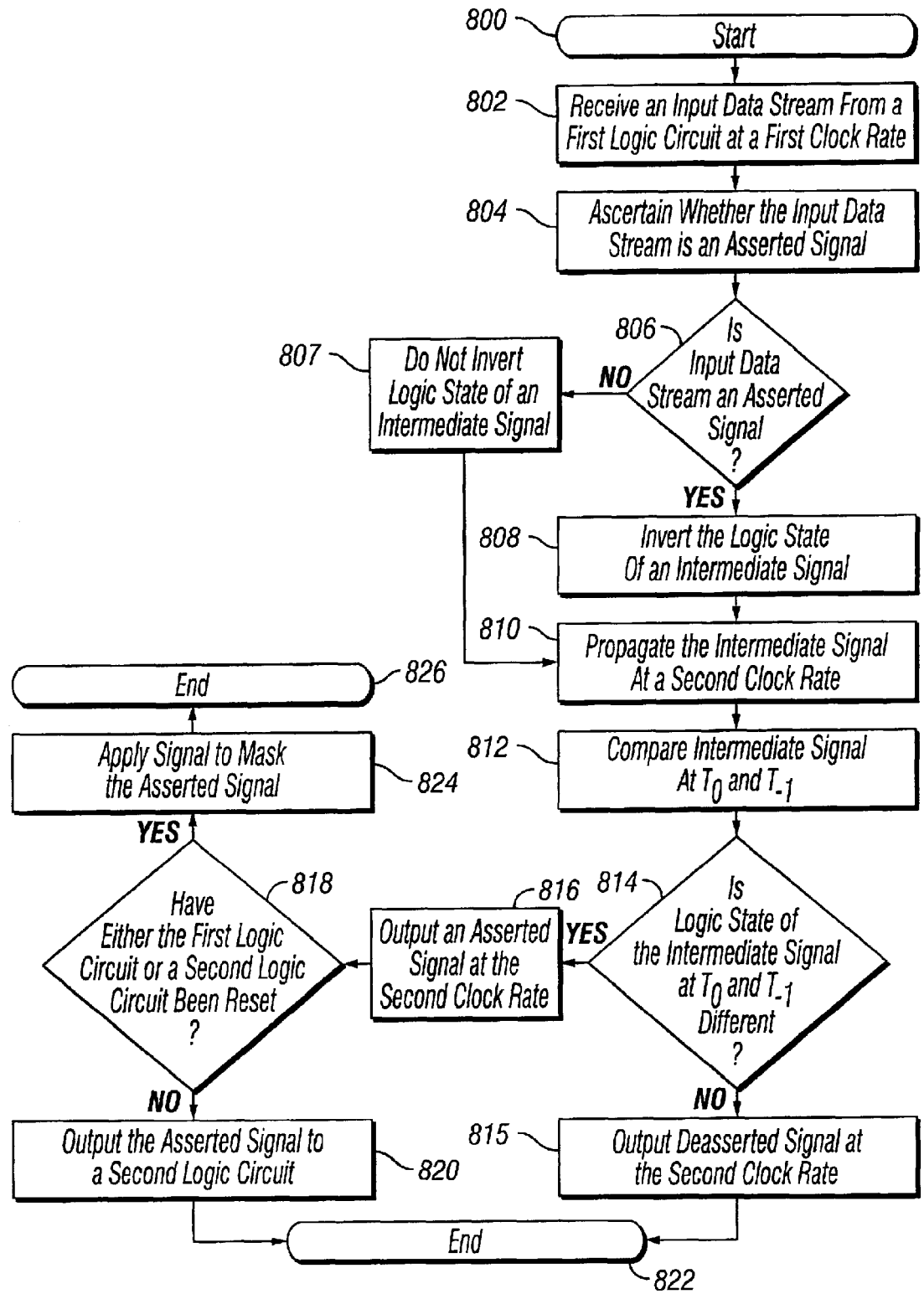
FIG. 8 is a flow chart illustrating an exemplary technique of interfacing logic circuits that operate at different clock rates.

FIG. 8 is a flow chart illustrating exemplary technique of interfacing logic circuits that operate at different clock rates. The method starts at step 800. An input logic block receives an input data stream from a first logic circuit at step 802. At step 804, an asserted signal of the input data stream is ascertained at a first clock rate. At step 806, if the input data stream is an asserted signal, the method proceeds to step 808. If the input data stream is not an asserted signal, then the method proceeds to step 807. At step 807, the logic state of an intermediate signal is not inverted. The method then proceeds to step 810 where the intermediate signal is propagated to an output logic block, which runs at a second clock rate.

At step 808, the logic state of an intermediate signal is inverted. Next, at step 810, the intermediate signal is propagated to an output logic block, which runs at a second clock rate. At step 812, the intermediate signal is compared at time $T_0$ and $T_{-1}$ (the time difference between $T_0$ and $T_{-1}$ is one clock period of the second clock rate). At step 814, a determination is made to whether the logic states of the intermediate signal at $T_0$ and $T_{-1}$ are different. If the logic states of the intermediate signal at $T_0$ and $T_{-1}$ are not different, the method proceeds to step 815. At step 815, the output logic block provides a deasserted signal at a second clock rate to a second logic circuit. Next, the method ends at step 822.

At step 814, if the logic states of the intermediate signal at $T_0$ and $T_{-1}$ are different, an asserted signal is outputted at step 816. Next, a determination is made at step 818, to ascertain whether the first logic circuit or the second logic circuit has been reset. If either the first logic circuit or the second logic circuit has been reset, a signal is applied to mask the output at step 824. The method ends as step 826. If neither the first logic circuit nor the second logic circuit have been reset, the asserted signal output is provided to a second logic circuit at step 820. The method ends at step 822.

As mentioned previously, alternatives to the various devices described above may be implemented. For example, the figures described above include flip-flops, multiplexors, and XOR and AND gates. These logic devices could be implemented instead in programmable logic.

The foregoing disclosure and description of the invention are illustrative and explanatory thereof, and various changes in the size, shape, materials, components, circuit elements, wiring connections and contacts, as well as in the details of the illustrative circuitry and construction and method of operation may be made without departing from the spirit of the invention.

We claim:

1. A computer system, comprising:
   a first logic circuit;
   a second logic circuit; and
   an interface coupling the first logic circuit to the second logic circuit, wherein the interface includes:
   an input logic block that receives an incoming data stream and a first clock from the first logic circuit, the input logic block provides an intermediate signal, wherein if the incoming data stream includes a first asserted signal, the intermediate signal inverts its logic state, wherein the input logic block includes;
      a multiplexor, the multiplexor receives the incoming data stream; and
      a first register coupled to the multiplexor; the first register is clocked by the first clock; wherein the multiplexor provides the first register the inverted version of the output of the first register when the incoming data stream includes the first asserted signal, the first register provides the intermediate signal; and
   an output logic block coupled to the input logic block, the output logic block receives the intermediate signal and a second clock, wherein the output logic block provides to the second logic circuit an output signal, the output signal is a second asserted signal for one clock period of the second clock, when the output logic block detects a logic state change in the intermediate signal.

2. The computer system of claim 1, wherein the first clock is not equal to the second clock.

3. The computer system of claim 2, wherein the interface further includes a plurality of metastability registers coupled between the input logic block and the output logic block.

4. The computer system of claim 1, wherein the output logic block includes,
   a second register, the second register includes a second input and a second output, the second register is clocked by the second clock and receives the intermediate signal; and
   an XOR gate coupled to the second register; wherein the second input and the second output of the second register is inputted to the XOR gate, the XOR gate provides the output signal.

5. The computer system of claim 4, wherein the first logic circuit includes a plurality of Intel IA-64 microprocessors.

6. The computer system of claim 4, wherein the second logic circuit is a plurality of PCI devices.

7. The computer system of claim 6, wherein one of the plurality of PCI devices is a SCSI controller.

8. The computer system of claim 4, wherein the second logic circuit does not receive the second asserted signal if the first logic circuit or the second logic circuit is reset.

9. An interface coupling a first logic circuit to a second logic circuit, comprising,
   an input logic block that receives an incoming data stream and a first clock from the first logic circuit, the input logic block provides an intermediate signal, wherein if the incoming data stream includes a first asserted signal, the intermediate signal inverts its logic state, wherein the input logic block includes;
      a multiplexor, the multiplexor receives the incoming data stream; and
      a first register coupled to the multiplexor; the first register is clocked by the first clock; wherein the multiplexor provides the first register the inverted version of the output of the first register when the incoming data stream includes the first asserted signal, the first register provides the intermediate signal; and
   an output logic block coupled to the input logic block, the output logic block receives the intermediate signal and a second clock, wherein the output logic block provides to the second logic circuit an output signal, the output signal is a second asserted signal for one clock period of the second clock, when the output logic block detects a logic state change in the intermediate signal.

10. The interface of claim 9, wherein the first clock does not equal the second clock.

11. The interface of claim 10, wherein the interface further includes a plurality of metastability registers coupled between the input logic block and the output logic block.

12. The interface of claim 9, wherein the output logic block includes,
   a second register, the second register includes a second input and a second output, the second register is clocked by the second clock and receives the intermediate signal; and
   an XOR gate coupled to the second register; wherein the second input and the second output of the second register is inputted to the XOR gate, the XOR gate provides the output signal.

13. The interface of claim 12, wherein the first logic circuit includes a plurality of Intel IA-64 microprocessors.

14. The interface of claim 12, wherein the second logic circuit includes a plurality of PCI devices.

15. The interface of claim 14, wherein the plurality of PCI devices includes a SCSI controller.

16. The interface of claim 12, wherein the second logic circuit does not receive the second asserted signal if the first logic circuit or the second logic circuit is reset.

17. A method for coupling a first logic circuit to a second logic circuit, comprising the step of:
   providing an input data stream from a first logic circuit clocked by a first clock to a first register;
   ascertaining a first asserted signal in the input data stream;
   creating an intermediate signal by inverting the output of the first register when the first asserted signal is received;
   comparing the logic states of the intermediate signal at different times, the different times equal to a first time period of a second clock;
   outputting a second asserted signal to a second logic circuit for a period equaled to the second clock when the logic states of the intermediate signal are different during the first time period.

18. The method of claim 17, wherein the first clock does not equal the second clock.

19. The method of claim 18, further comprising the step of masking the second asserted signal if the first logic circuit or the second logic circuit receives a reset signal.

20. The method of claim 18, wherein the first logic circuit is a plurality of Intel IA-64 microprocessors.

21. The method of claim 18, wherein the second logic circuit is a plurality of PCI devices.

22. The method of claim 21, wherein the plurality of PCI devices includes a SCSI controller.

* * * * *